(12) United States Patent
Liu et al.

(10) Patent No.: US 9,997,175 B1
(45) Date of Patent: Jun. 12, 2018

(54) ELECTRIC ARM LIFTING AND TURNTABLE'S AUTO-STOP ASSEMBLY OF RECORD PLAYER

(71) Applicant: HANPIN ELECTRON CO., LTD., Tainan (TW)

(72) Inventors: Shen-Keng Liu, Tainan (TW); Hsi-Ping Wang, Tainan (TW)

(73) Assignee: Hanpin Electron Co., Ltd., Tainan (TW)

( * ) Notice: Subject to any disclaimer, the term of this patent is extended or adjusted under 35 U.S.C. 154(b) by 0 days. days.

(21) Appl. No.: 15/705,475

(22) Filed: Sep. 15, 2017

(51) Int. Cl.
| | |
|---|---|
| *G11B 7/00* | (2006.01) |
| *G11B 3/085* | (2006.01) |
| *G11B 3/34* | (2006.01) |
| *G11B 3/60* | (2006.01) |
| *G11B 3/06* | (2006.01) |

(52) U.S. Cl.
CPC ............ *G11B 3/08506* (2013.01); *G11B 3/06* (2013.01); *G11B 3/34* (2013.01); *G11B 3/60* (2013.01)

(58) Field of Classification Search
None
See application file for complete search history.

(56) References Cited

U.S. PATENT DOCUMENTS

| | | | | |
|---|---|---|---|---|
| 4,325,016 A | * | 4/1982 | Takeuchi | ................. G05D 3/16 318/640 |
| 4,399,528 A | * | 8/1983 | Suzuki | ............... G11B 3/08512 312/8.5 |
| 4,437,180 A | * | 3/1984 | Takeuchi | ............... G11B 3/085 369/216 |
| 4,473,898 A | * | 9/1984 | Ono | .................... G11B 3/08503 369/221 |
| 5,815,470 A | * | 9/1998 | Ohmori | ............ G11B 11/10558 360/266.2 |
| 2006/0164933 A1 | * | 7/2006 | Fujimoto | ............ G11B 17/021 369/30.78 |

* cited by examiner

*Primary Examiner* — Peter Vincent Augustin
(74) *Attorney, Agent, or Firm* — Rosenberg, Klein & Lee

(57) ABSTRACT

An electric arm lifting and turntable's auto-stop assembly of a record player is revealed. A record player is disposed with a power-driven turntable, a rotatable and movable arm disposed on one side of the turntable, a lift mechanism used for pushing against and moving the arm upward, and a sensor. The arm is moveable over the turntable. The sensor is arranged at an arm rotating shaft of the arm and used for sending a signal while detecting that the arm is moved to a lift point over the turntable. The lift mechanism is activated to move the arm upward and the turntable is stopped simultaneously for protecting a needle on the arm while the sensor detects that the arm has been moved from the turntable to the lift point.

2 Claims, 5 Drawing Sheets

ELECTRIC ARM LIFTING AND TURNTABLE'S AUTO-STOP ASSEMBLY OF RECORD PLAYER

BACKGROUND OF THE INVENTION

Field of the Invention

The present invention relates to an electric arm lifting and turntable's auto-stop assembly of a record player, especially to an electric arm lifting and turntable's auto-stop assembly of a record player that lifts an arm and stops a turntable simultaneously by controlling on/off of power sources.

Description of Related Art

Generally, a record player available now mainly includes a turntable base, a turntable where a vinyl record sits disposed on the turntable base and driven to revolve, and a tone arm used for reading music information in the vinyl record. A cartridge is on a front end of the tone arm and a stylus is disposed on the cartridge. Vibrations are generated when the stylus follows the grooves of the record. Then the vibrations travel through the tone arm and hit coils within a magnetic field contained in the cartridge to be transformed into electrical signals. Next the electrical signals are amplified by an amplifier and broadcasted though speakers. Thus we can hear music or whatever recorded on the vinyl record.

While in use, the arm is dragged to the rotating record by users and the stylus is moved along the grooves to play delightful music. Once the users forget to turn off the record played just in time due to falling asleep or other factors, the turntable is still rotated and the stylus keeps scratching the record when all of the music in the record has been played. Thus the power is waster and the grooves of the record may get damaged or the stylus is worn out.

However, the vinyl record is getting rare. The core component used to move along the grooves of the record and read sounds saves is the stylus. A set of high end cartridge and stylus made of diamond is worth tens of thousands of dollars. Thus professional users should take good care of the stylus. The record layer available now has the worn stylus problem so that it's not good in use.

Thus there is room for improvement and there is a need to provide an electric arm lifting and turntable's auto-stop assembly of a record player that solves the problems mentioned above.

SUMMARY OF THE INVENTION

Therefore it is a primary object of the present invention to provide an electric arm lifting and turntable's auto-stop assembly of a record player that drives an arm to lift and stops a turntable automatically and simultaneously.

In order to achieve the above object, an electric arm lifting and turntable's auto-stop assembly of a record player according to the present invention mainly includes a power-driven turntable, a rotatable and movable arm disposed on one side of the turntable, a lift mechanism arranged at one side of the arm, and a sensor set on a arm rotating shaft. The arm can be moved to the turntable. The lift mechanism is used for pushing against and moving the arm upward and the sensor is used to detect whether the arm has been moved to a lift point. Thereby the lift mechanism is activated to push against and move the arm upward and simultaneously the turntable is stopped for protecting a needle on the arm when the sensor detects that the arm has been moved from the turntable to the lift point.

The electric arm lifting and turntable's auto-stop assembly of a record player further includes a turntable power source connected to a rotation shaft of the turntable and used for driving the turntable to rotate.

The lift mechanism consists of a lifting power source, a transmission part, a rotating block, a link part, a return spring, and a lift rod part. The lifting power source is connected to the transmission part for driving the transmission part. An output shaft of the transmission part is connected to the rotating block so that the rotating block is driven by the transmission part and turned from side to side. The rotating block is connected to the link part for driving the link part to move. The return spring is fit around the link part while the lift rod part is disposed on a top end of the link part and is in contact with the arm. The arm is moved up and down along with the lift rod part driven by the link part.

The rotating block is disposed with a hand lever. The hand lever is used for driving the rotating block to rotate and change directions. Thus users can turn the arm back by manual operation of the hand lever.

The electric arm lifting and turntable's auto-stop assembly of the record player further includes a microcontroller for receiving signals from the sensor. The microcontroller is connected to both the lifting power source and the turntable power source for control of their on/off operations.

Compared with the record player available now, the present invention has the following advantages.

1. In the present invention, the lift mechanism is activated to move the arm upward and simultaneously the turntable is stopped for protecting a needle on the arm when the sensor detects that the arm has been moved from the turntable to the lift point.

2. The present invention uses the sensor to monitor the movement of the arm. Thus the arm can be lifted automatically by electronic technology.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical features and functions of the present invention, please refer to the following embodiment with detailed descriptions, the related figures and the reference numbers.

Figure 1:
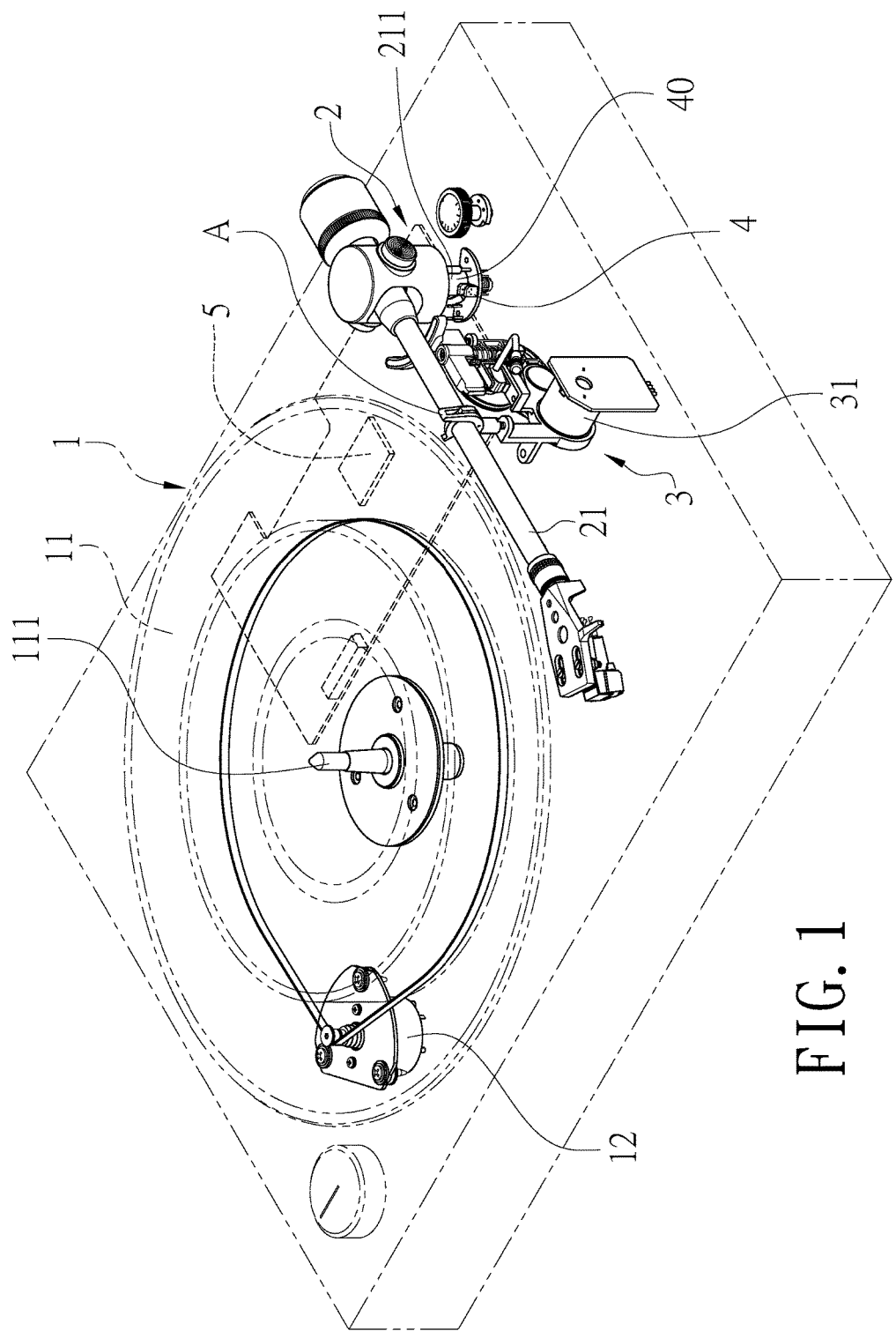
FIG. 1 is a perspective view of an embodiment according to the present invention.
Figure 2:
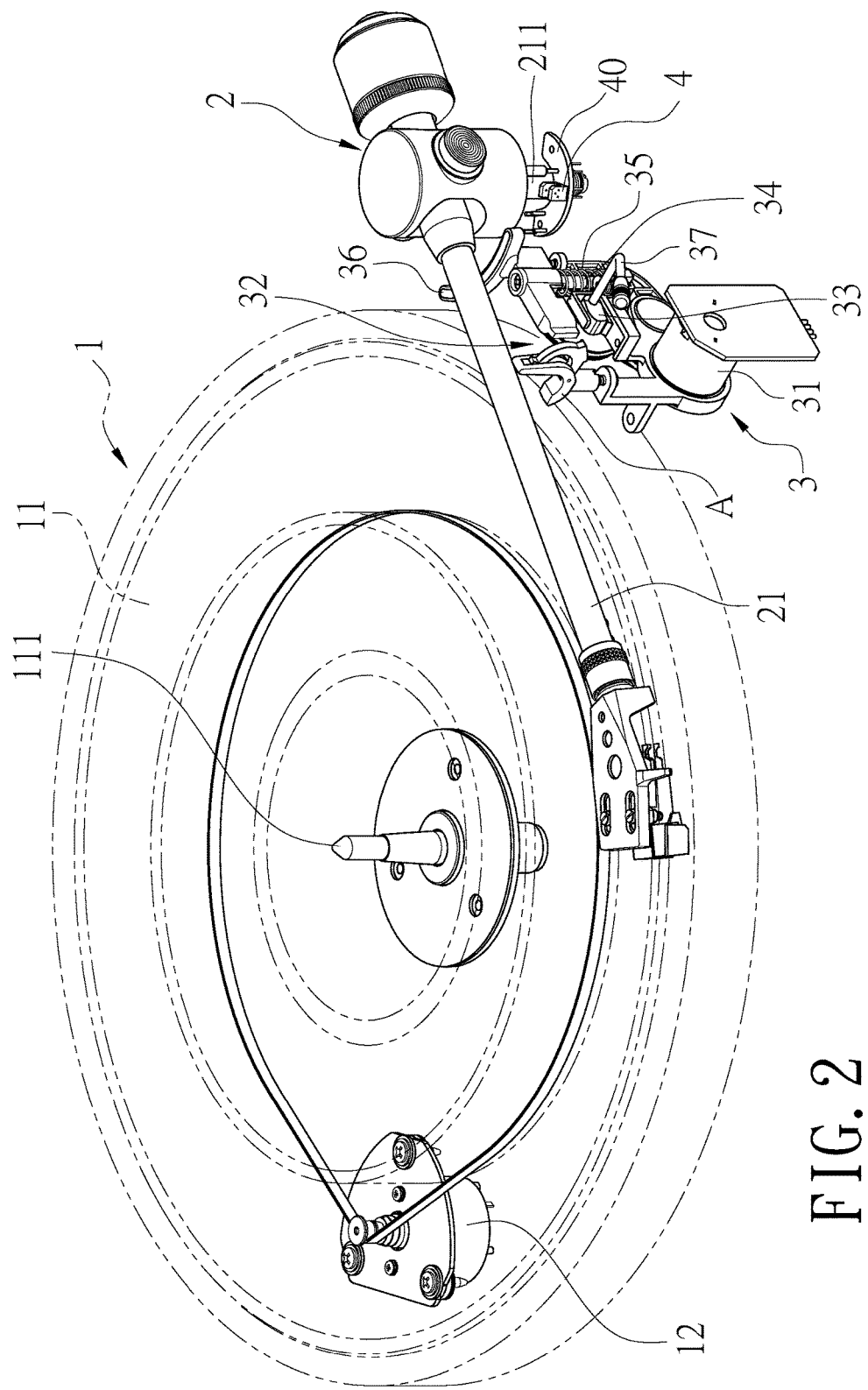
FIG. 2 is a partial perspective view of an embodiment according to the present invention.
Figure 3:
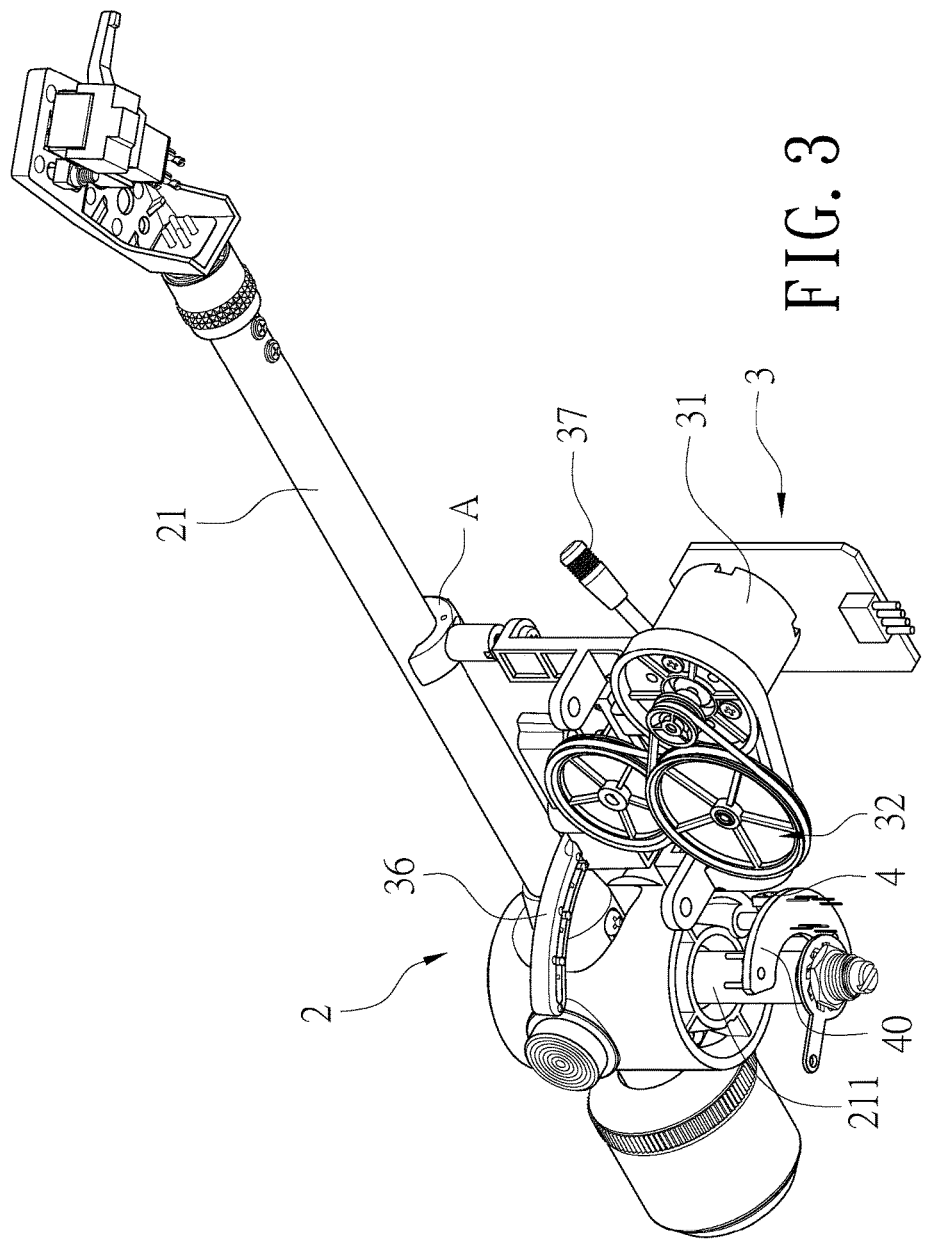
FIG. 3 is a perspective view of a pickup arm portion of an embodiment according to the present invention.
Figure 4:
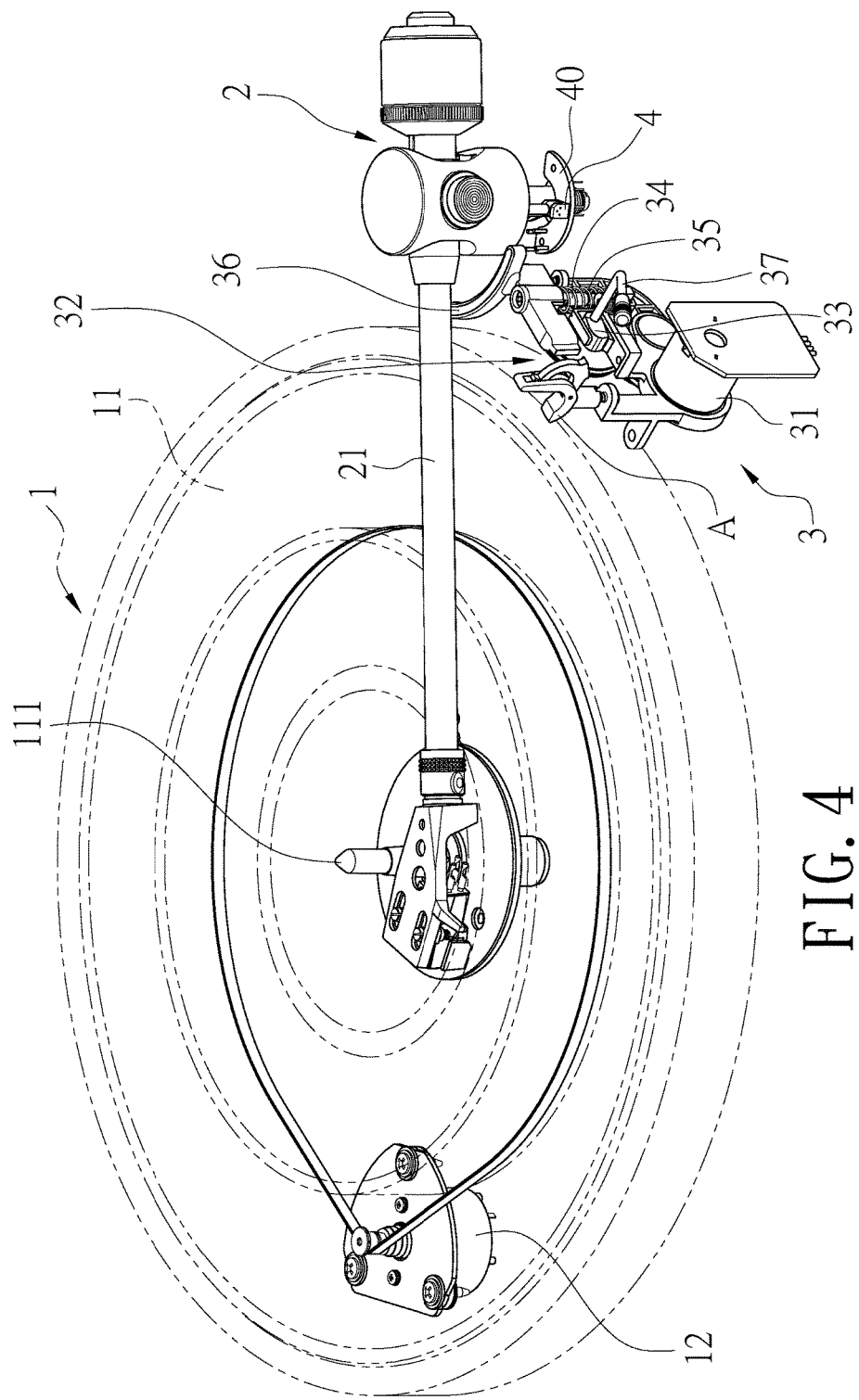
FIG. 4 is a schematic drawing showing a pickup arm portion moved over a turntable of an embodiment according to the present invention.
Figure 5:
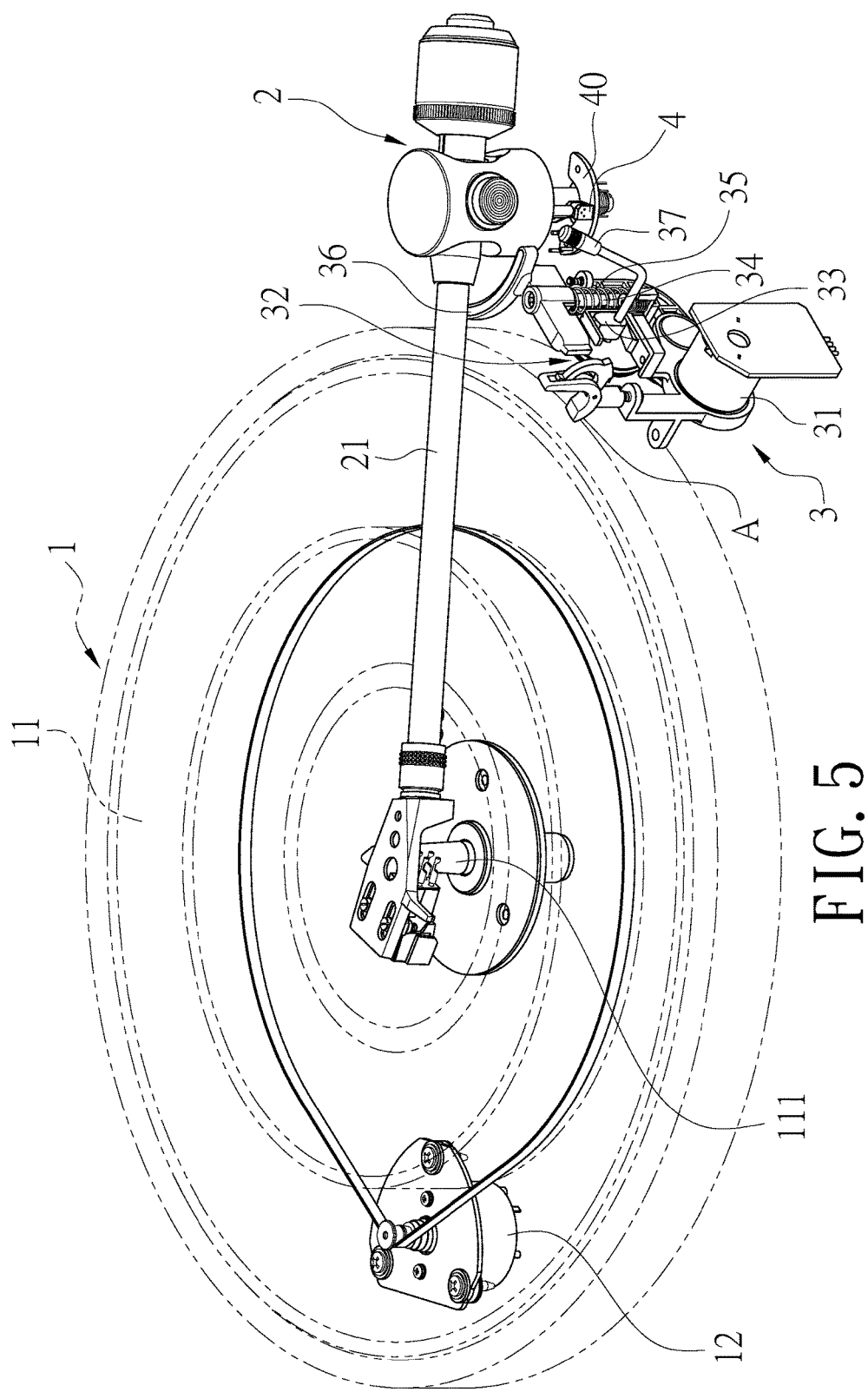
FIG. 5 is a schematic drawing showing lifting of a pickup arm portion of an embodiment according to the present invention.

Refer to FIG. 1, FIG. 2 and FIG. 3, an electric arm lifting and turntable's auto-stop assembly of the present invention includes a turntable portion 1, a pickup arm portion 2, a lift mechanism 3, a sensor 4, and a microcontroller 5.

The turntable portion 1 consists of a turntable 11 for loading records, and a turntable power source 12. The turntable 11 is disposed with a rotation shaft 111 that is connected to and driven by the turntable power source 12. The way that the turntable power source 12 drives the turntable 11 includes belt-driving and direct driving by an output shaft of the turntable power source 12 as the rotation shaft 111.

The pickup arm portion 2 is arranged at one side of the turntable portion 1 and including an arm 21 with an arm rotating shaft 211. The arm 21 is rotated and moved by the arm rotating shaft 211. The lift mechanism 3 that pushes against the arm 21 and moves the arm upward is set under one side of the arm 21. The lift mechanism 3 includes a lifting power source 31 used for driving and lifting the arm 21.

A platform 40 is disposed on the arm rotating shaft 211 and the sensor 4 is set thereon. The sensor 4 is used for detecting whether the arm 21 has been moved to a lift point. The lift point is defined as the position the arm 21 being stopped and lifted to after a record player needle/stylus on the arm 21 being reached the end of the grooves of the record.

The microcontroller 5 is used to receive signals from the sensor 4. The microcontroller 5 is connected to both the lifting power source 31 and the turntable power source 12 to control on/off operations of the lifting power source 31 and of the turntable power source 12 according to the signals from the sensor 4.

First place a record (vinyl record) on the turntable 11 and then turn on the record player for spinning of the turntable 11 while in use. At the moment, the arm 21 originally rested on a locking seat A of the record player is released from the locking seat A and lifted to place the needle into one of the grooves of the record. The needle picks up the vibrations from the grooves and turns them into sound. The arm 21 also follows the record's grooves into the center of the record.

The sensor 4 sends a signal to the microcontroller 5 so that the microcontroller 5 turns on the lift mechanism 3 when the sensor 4 detects that the arm 21 has been moved to the lift point after the needle on the arm 21 being reached the end of the grooves of the record. As shown in FIG. 2, the lift mechanism 3 is composed of the lifting power source 31, a transmission part 32, a rotating block 33, a link part 34, a return spring 35, and a lift rod part 36. The lifting power source 31 is connected to the transmission part 32 and used for driving the transmission part 32. An output shaft of the transmission part 32 is connected to the rotating block 33 so that the rotating block 33 is driven by the transmission part 32 and turned from side to side. The rotating block 33 is connected to the link part 34 for driving the link part 34 to move. The return spring 35 is fit around the link part 34 while the lift rod part 36 is disposed on a top end of the link part 34 and is in contact with the arm 21. Thus the arm 21 is moved up and down along with the lift rod part 36 driven by the link part 34. Once the microcontroller 5 initiates the lift mechanism 3, the lifting power source 31 drives the transmission part 32 and the lift rod part 36 is driven to move and lift the arm 21. Thus the needle jumps out of the grooves. At the same time, the microcontroller 5 also turns off the turntable power source 12 and stops the turntable 11. The synchronous operation of the microcontroller 5 protects the needle on the arm 21 from damages and extends the service life of the needle.

The rotating block 33 is further arranged with a hand lever 37 used for driving the rotating block 33 to rotate and change directions. After the arm 21 being lifted, the user can turn the arm 21 back to the original position on the locking seat A manually. At the moment, the lift rod part 36 of the lift mechanism 3 is in the rising state. The hand lever 37 is operated manually to change rotating direction of the rotating block 33 for turning the lift rod part 36 back. Thus the arm 21 is moved back to be positioned on the locking seat A. The present invention allows users to operate the record player manually, combining the retro style with the creative technology nowadays.

The above turn-back of the arm 21 can also be achieved by forward/reverse operation of the lifting power source 31. The turn-back function can also be modified according to user's requirements so as to achieve automatic operation.

In summary, the present invention has the following advantages compared with the record player available now.
1. In the present electric arm lifting and turntable's auto-stop assembly, the lift mechanism is activated to push against and move the arm upward and simultaneously the turntable is stopped for protecting a needle on the arm when the sensor detects that the arm has been moved from the turntable to the lift point.
2. The present electric arm lifting and turntable's auto-stop assembly uses the sensor to monitor the movement of the aim. Thus the arm can be lifted automatically by electronic technology.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:
1. An electric arm lifting and turntable's auto-stop assembly comprising:
   a turntable portion having a turntable disposed with a rotation shaft and used for loading records, and a turntable power source used for driving the turntable to rotate; the rotation shaft being connected to the turntable power source;
   a pickup arm portion that is arranged at one side of the turntable portion and including an arm disposed with an arm rotating shaft used for rotation and movement of the arm;
   a lift mechanism used for moving the arm upward, set under one side of the arm and including a lifting power source for driving and lifting the arm;
   a sensor arranged at a platform on the arm rotating shaft and used for detecting whether the arm has been moved to a lift point; the lift point is the position the arm being stopped and lifted to after a needle on the arm reaching the end of grooves of the record;
   a microcontroller used for receiving signals from the sensor and connected to both the lifting power source and the turntable power source for control of on/off operations of the lifting power source and of the turntable power source according to the signals from the sensor received;
   a transmission part connected to the lifting power source for driving the transmission part;
   a rotating block connected to an output shaft of the transmission part so that the rotating block is driven by the transmission part and turned from side to side;
   a link part connected to the rotating block for driving the link part to move; and
   a return spring and a lift rod part, the return spring being fit around the link part while the lift rod part is disposed on a top end of the link part and is in contact with the arm so that the arm is moved up and down along with the lift rod part driven by the link part.

2. The device as claimed in claim 1, wherein the rotating block is disposed with a hand lever; the hand lever is used for driving the rotating block to rotate and change directions.

* * * * *